No. 858,571.

PATENTED JULY 2, 1907.

B. F. CAMPBELL.
SIGNAL OR ALARM.
APPLICATION FILED APR. 26, 1906.

WITNESSES:
W. L. Babcock
O. R. Hunter

INVENTOR
Benjamin F. Campbell
BY
Robt. P. Hains
ATTORNEY

THE NORRIS PETERS CO., WASHINGTON, D. C.

UNITED STATES PATENT OFFICE.

BENJAMIN F. CAMPBELL, OF LITTLE ROCK, ARKANSAS, ASSIGNOR OF ONE-HALF TO JOHN E. COATES, OF LITTLE ROCK, ARKANSAS.

SIGNAL OR ALARM.

No. 858,571.  Specification of Letters Patent.  Patented July 2, 1907.

Application filed April 26, 1906. Serial No. 313,799.

*To all whom it may concern:*

Be it known that I, BENJAMIN F. CAMPBELL, a citizen of the United States, residing at Little Rock, in the county of Pulaski and State of Arkansas, have invented certain new and useful Improvements in Signals or Alarms, of which the following is a specification.

The invention to be hereinafter described relates to signals or alarms, and more particularly to that type which is made operative by a variation in air or fluid pressure.

It has been found necessary in practice to supply lubricant to relatively movable parts of a mechanical system, especially to the valves and like details subjected to the action of steam. On account of the surrounding conditions of use it has been practically demonstrated that the necessary lubricant, as, for instance, graphite or its compositions, is best applied to the moving parts at intervals by a blast of air or other fluid supplied, as in the case of a railroad train, either from the main air pressure or brake system, or from a main reservoir. In such cases, however, the engineer or other employee is liable to permit the lubricant supply valves to remain open too long, or even after the charge of lubricant has been blown to the parts to be lubricated, thereby causing a lowering of the air or fluid pressure in the supply system and more or less waste of lubricant.

With the above general considerations in view the object of the present invention is to provide a signal or alarm, which, when the lubricant valves have not been properly closed, or the pressure of the air or fluid in the supply system has decreased to a predetermined amount, will be made operative and indicate the fact or facts to the engineer or other employee.

The invention consists of the parts and combinations hereinafter fully described and definitely pointed out in the claims.

Figure 1:
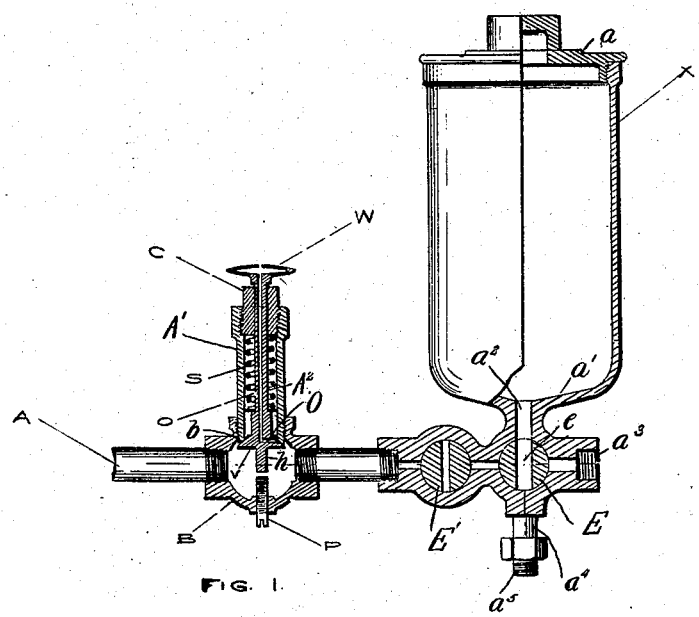
Figure 2:
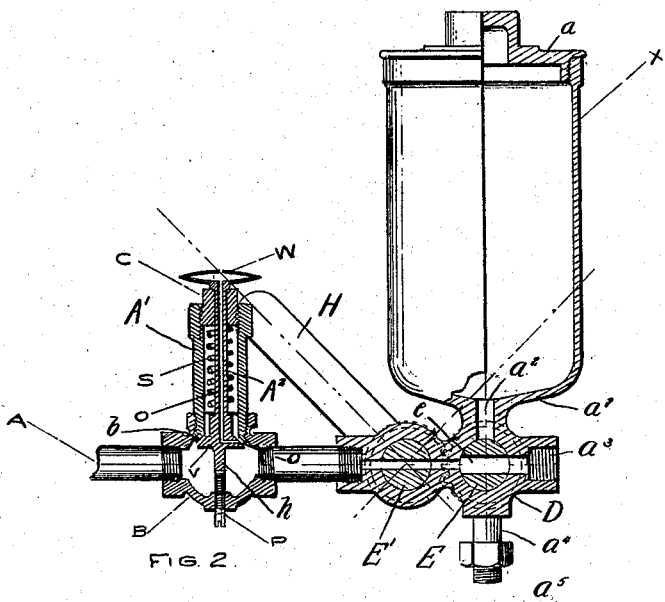

In the drawings: Figure 1 is a sectional elevation of a signal or alarm associated with the lubricant supplying device and its valves, the latter being shown in closed position. Fig. 2 is a like view showing the lubricant valves in open position and the signal or alarm indicating that fact.

The form of the lubricant supplying device selected for illustration, comprises a reservoir or cup X having a usual cover $a$ and a contracted lower portion $a'$. Disposed preferably below the reservoir or cup X are the lubricant valve elements and their casing, the latter being selectively shown as formed integral with the reservoir or cup, although obviously this is not essential. The valve casing D is provided with suitable valve seats for the two valves E and E', the valve E for controlling the charge of lubricant delivered from the reservoir or cup X through the opening $a^2$ into the lubricant charging chamber $e$ of valve E, being denominated for identification—the lubricant valve; and the valve E' for controlling the air or fluid being denominated—the air valve.

The casing D is extended preferably at $a^3$ for attachment to the delivery pipe leading to the parts to be lubricated, and has also an extension $a^4$ and nut $a^5$ for securing the device to some fixed or stationary part. To the casing D is connected the air or supply pipe A leading from the air brake system or from the main reservoir. From the construction thus far described, it will be seen that the parts being in position as indicated in Fig. 1, the lubricant valve E will receive a supply of lubricant into its chamber $e$, and the air valve E' cuts off the air or fluid pressure. If, however, the parts are turned into position, as indicated in Fig. 2, the lubricant valve E will bring its chamber $e$ into line with the pipe connection leading to the parts to be lubricated and the air valve E' will admit a blast of air or fluid through both valves to carry the charge of lubricant to the desired parts. Under the conditions above indicated the air or fluid pressure in the system connected to pipe A will gradually fall unless the valves E E' are turned to their original position, and when such fall in pressure reaches a predetermined amount, it will be indicated by the signal or alarm connected to pipe A, as will now be described.

Connected to the pipe A at a suitable point is the stock B of the signal or alarm. Rising from the stock B is the casing A' formed at its lower portion with a valve seat $b$. Disposed within the casing A' is a signal or valve stem A², said stem carrying the valve V at its lower end and a suitable signal or whistle W at its upper exposed end. The valve stem A² and the valve V are provided with intersecting passageways O O such passageways leading to the whistle W so that, should any air or other fluid pressure pass through these passageways, it will enter the whistle and give the alarm or signal desired. It will be noted that the passageway in the valve V is formed in the seating portion of the valve so that, should the valve become unseated for any reason, air or fluid pressure in the pipe A will pass into and through such passageway and through the passageway in the valve stem and operate the whistle or signal as described.

Surrounding the valve stem A² near its upper portion is a nut C screw-threaded into the casing A', and between said nut and the valve V is disposed the spiral spring S, the energy of which may be adjusted by suitable manipulation of the nut C.

Projecting downward from the valve V is the limiting stem $h$, which is adapted to contact with the end of an adjusting stop or screw P when the valve and its stem are free to move downward, all as shown in Figs. 1 and 2.

It is obvious, of course, that the details of the signal or alarm may be varied, the essential feature being that it shall be provided with a valve adapted to be unseated upon a predetermined fall of pressure in the air system to which it is connected and which, by such unseating of the valve, will expose to the action of the air a passageway which is connected to a suitable whistle or alarm. It will be obvious, also, that the spring S, being adjustable as to its energy of action against the valve V, adapts the signal or alarm to conditions of varying pressure, as desired, in the system to which it is connected. Thus, by adjusting the nut C downward and compressing the spring S, the valve E will be opened when the air pressure in the system to which the pipe A is connected reaches a certain predetermined pressure, and by adjusting the nut relatively upward from such position, the valve becomes unseated, obviously, when the pressure of the air system is lower than that necessary in the first example.

The lubricant valve E and the air valve E′ may be either independently turned by suitable handles, as understood, or the two valves E E′ may be connected, as shown in Fig. 2 by means of gearing so that, upon turning the single handle, as H, Fig. 2, the two valves E E′, may be simultaneously moved from their closed to their open position or vice versa.

From the construction thus described, it will be seen that the valves E E′ may be suitably manipulated by the engineer or other attendant to carry a charge of lubricant in the lubricant chamber $e$ into alinement with the pipe for conducting such lubricant to the parts to be lubricated and that, at such time, a blast of air may be supplied from the pipe A which is connected to the air pressure system of the train or main reservoir. Should the engineer or other attendant fail to close the valves E E′, obviously, the pressure of air in the system to which the pipe A is connected will be lowered, and at such time, depending on the adjusted tension of the spring S, and when the pressure has been lowered to a predetermined point, the valve V will be forced downward as shown in Fig. 2, and air be admitted through the passageways O O to the whistle W, thereby giving warning that the air pressure in the system has been lowered to an undesirable point, or that the valves controlling the discharge of lubricant to the parts to be lubricated have not been properly closed.

Having thus described my invention what I claim and desire to secure by Letters Patent is:—

1. In a device of the character described, the combination of a lubricant supplying means, valve devices for controlling the supply of lubricant to the parts to be lubricated, a pipe connected to a source of air or fluid pressure and communicating with said valve devices for forcing a charge of lubricant to the desired parts, a signal or alarm connected to said pipe and comprising a casing, a valve, a valve stem extended through said casing, said valve and stem being provided with intersecting passageways, and means to unseat the valve and permit air or fluid to pass through the passageways when the pressure in the pipe decreases to a predetermined amount, due to the opening of the valve devices for controlling the supply of lubricant.

2. In a device of the character described, the combination of a lubricant supplying means, valve devices for controlling the supply of lubricant to the parts to be lubricated, a pipe connected to a source of air or fluid pressure and communicating with said valve devices for forcing a charge of lubricant to the desired parts, a signal or alarm connected to said pipe and comprising a casing, a valve, a valve stem extended through said casing, a spring normally acting to unseat the valve, said valve and stem being provided with passageways, the passageways in the valve being closed when the valve is seated, and an alarm connected to the valve stem so that upon decrease of the air or fluid pressure to a predetermined amount in said pipe due to the opening of the lubricant controlling valve devices, the valve will be unseated and the alarm sounded.

3. In a device of the character described, the combination of a lubricant supplying means, valve devices for controlling the supply of lubricant to the parts to be lubricated, a pipe connected to a source of air or fluid pressure and communicating with said valve devices for forcing a charge of lubricant to the desired parts, a signal or alarm connected to said pipe and comprising a casing, a valve, a valve stem extended through said casing, a spring normally acting to unseat the valve, means for adjusting the tension of said spring, said valve and stem being provided with passageways, the passageways in the valve being closed when the valve is seated, and an alarm connected to the valve stem so that upon decrease of the air or fluid pressure to a predetermined amount in said pipe due to the opening of the lubricant controlling valve devices, the valve will be unseated and the alarm sounded.

4. In a device of the character described, the combination of a lubricant supplying means, valve devices for controlling the supply of lubricant to the parts to be lubricated, a pipe connected to a source of air or fluid pressure and communicating with said valve devices for forcing a charge of lubricant to the desired parts, a signal or alarm connected to said pipe and comprising a casing, a valve, a valve stem extended through said casing, said valve and stem being provided with intersecting passageways, a sound producing device communicating with said passageways and means to unseat the valve and permit air or fluid to pass through the passageways when the pressure in the pipe decreases to a predetermined amount due to the opening of the lubricant supplying valve devices and an adjustable stop for limiting the unseating movement of the valve.

In testimony whereof I affix my signature in presence of two witnesses.

BENJAMIN F. CAMPBELL.

Witnesses:
J. E. COATES,
R. W. NEWELL.